US012748017B2

(12) United States Patent
Lindberg et al.

(10) Patent No.: US 12,748,017 B2
(45) Date of Patent: Sep. 29, 2026

(54) DETERMINING A STATE OF EQUIPMENT

(71) Applicant: SANDVIK SRP AB, Svedala (SE)

(72) Inventors: Mikael Lindberg, Svedala (SE); Petra Sundstrom, Svedala (SE); Marie Rubin, Svedala (SE); Anders Hoven, Svedala (SE); Mats Dahlberg, Svedala (SE)

(73) Assignee: Sandvik SRP AB, Svedala (SE)

( * ) Notice: Subject to any disclaimer, the term of this patent is extended or adjusted under 35 U.S.C. 154(b) by 253 days.

(21) Appl. No.: 18/284,389

(22) PCT Filed: Mar. 30, 2022

(86) PCT No.: PCT/EP2022/058416
§ 371 (c)(1),
(2) Date: Sep. 27, 2023

(87) PCT Pub. No.: WO2022/207708
PCT Pub. Date: Oct. 6, 2022

(65) Prior Publication Data

US 2024/0159626 A1 May 16, 2024

(30) Foreign Application Priority Data

Mar. 31, 2021 (EP) .................................... 21166179

(51) Int. Cl.
*G01M 99/00* (2011.01)
*B02C 25/00* (2006.01)

(52) U.S. Cl.
CPC ........... *G01M 99/005* (2013.01); *B02C 25/00* (2013.01)

(58) Field of Classification Search
CPC ............................. G01M 99/005; B02C 25/00
See application file for complete search history.

(56) References Cited

U.S. PATENT DOCUMENTS

| | | | |
|---|---|---|---|
| 10,503,145 | B2 | 12/2019 | Germann et al. |
| 10,671,503 | B2 | 6/2020 | Frenz et al. |
| 10,847,012 | B2 | 11/2020 | Anand et al. |

FOREIGN PATENT DOCUMENTS

| | | | | | |
|---|---|---|---|---|---|
| CN | 110193420 | A | 9/2019 | | |
| CN | 211190340 | U | 8/2020 | | |
| JP | 2017209595 | A | 11/2017 | | |
| JP | 2020011160 | A * | 1/2020 | | |
| WO | WO-02070137 | A1 * | 9/2002 | ............. | B02C 23/04 |
| WO | WO-2006108178 | A2 * | 10/2006 | ............. | B02C 13/31 |

* cited by examiner

*Primary Examiner* — Jamel E Williams
(74) *Attorney, Agent, or Firm* — Corinne R. Gorski

(57) ABSTRACT

An apparatus, method and computer program product for receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

15 Claims, 4 Drawing Sheets

DETERMINING A STATE OF EQUIPMENT

RELATED APPLICATION DATA

This application is a § 371 National Stage Application of PCT International Application No. PCT/EP2022/058416 filed Mar. 30, 2022 with priority to EP 21166179.8 filed Mar. 31, 2021.

TECHNICAL FIELD

The present application relates generally to determining a state of equipment. More specifically, the present application relates to determining a state of equipment utilizing a plurality of sources of information.

BACKGROUND

As machines are developed, also different ways of controlling and monitoring a site with a large variety of equipment are studied. Some machines need to be monitored in real-time, while other machines need to be monitored only every now and then. Finding a suitable balance between these approaches may be challenging.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

According to a second aspect of the invention, there is provided a method comprising: receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

According to a third aspect of the invention, there is provided a computer program comprising instructions for causing an apparatus to perform at least the following: receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

According to a fourth aspect of the invention, there is provided an apparatus comprising at least one processor and at least one memory including computer program code, the at least one memory and the computer program code configured to with the at least one processor, cause the apparatus at least to: receive a first type of information relating to operation of rock processing equipment from a first source of information, receive a second type of information relating to the operation of the rock processing equipment from a second source of information, determine, based on the first type of information and the second type of information, a state of the rock processing equipment, and provide, in response to determining that the state of the rock processing equipment fulfills at least one criterion, an indication relating to the state of the rock processing equipment.

According to a fifth aspect of the invention, there is provided a non-transitory computer readable medium comprising program instructions for causing an apparatus to perform at least the following: receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

According to a sixth aspect of the invention, there is provided a computer readable medium comprising program instructions for causing an apparatus to perform at least the following: receiving a first type of information relating to operation of rock processing equipment from a first source of information, receiving a second type of information relating to the operation of the rock processing equipment from a second source of information, determining, based on the first type of information and the second type of information, a state of the rock processing equipment, and providing, in response to determining that the state of the rock processing equipment fulfills at least one criterion, an indication relating to the state of the rock processing equipment.

BRIEF DESCRIPTION OF THE DRAWINGS

Some example embodiments will now be described with reference to the accompanying drawings.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to determining a state of equipment. More particularly, example embodiments relate to determining a state of equipment utilizing a plurality of sources of information. The equipment may comprise, for example, equipment provided on a crushing plant.

Crushing plants make use of a large variety of equipment such as pre-screeners, loading conveyors, intake hoppers, magnetic separators, crushing units such as jaw crushers, cone crushers, or the like. Improving efficiency and quality of crushing plants in varying circumstances may require individual control of pieces of the equipment. However, crushing plants may comprise equipment provided by different manufacturers and, therefore, different pieces of the equipment may be noncompatible in terms of not being able to communicate with each other. Therefore, determining a state of the equipment may become complicated as different pieces of the equipment need different solutions for determining the state of the equipment. Further, in some cases information relating to rock processing equipment received merely in a form of, for example, measurement data may not be sufficient or reliable enough to determine a state of the rock processing equipment.

An example embodiment relates to an apparatus configured to receive a first type of information relating to operation of rock processing equipment from a first source of information, receive a second type of information relating to the operation of the rock processing equipment from a second source of information, determine, based on the first type of information and the second type of information, a state of the rock processing equipment, and provide, in response to determining that the state of the rock processing equipment fulfills at least one criterion, an indication relating to the state of the rock processing equipment.

Figure 1:
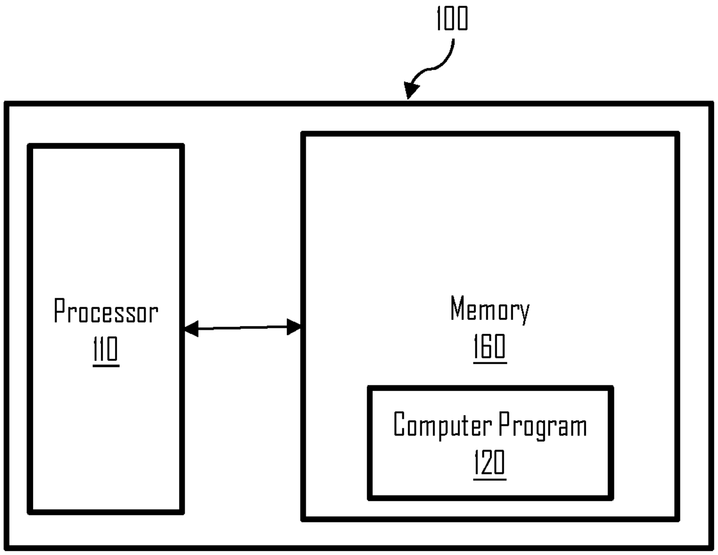
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a module comprised by an automation or control system, a module communicating with an automation or control system, a chip or a chipset. The apparatus 100 comprises one or more control circuitry, such as at least one processor 110 and at least one memory 160, including one or more algorithms such as computer program instructions 120 wherein the at least one memory 160 and the computer program instructions are configured, with the at least one processor 110 to cause the apparatus to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The at least one memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a USB stick, a Compact Disc (CD), a Compact Disc Read-Only Memory (CD-ROM), a Digital Versatile Disk (DVD) or a Blu-ray disk.

Figure 2:
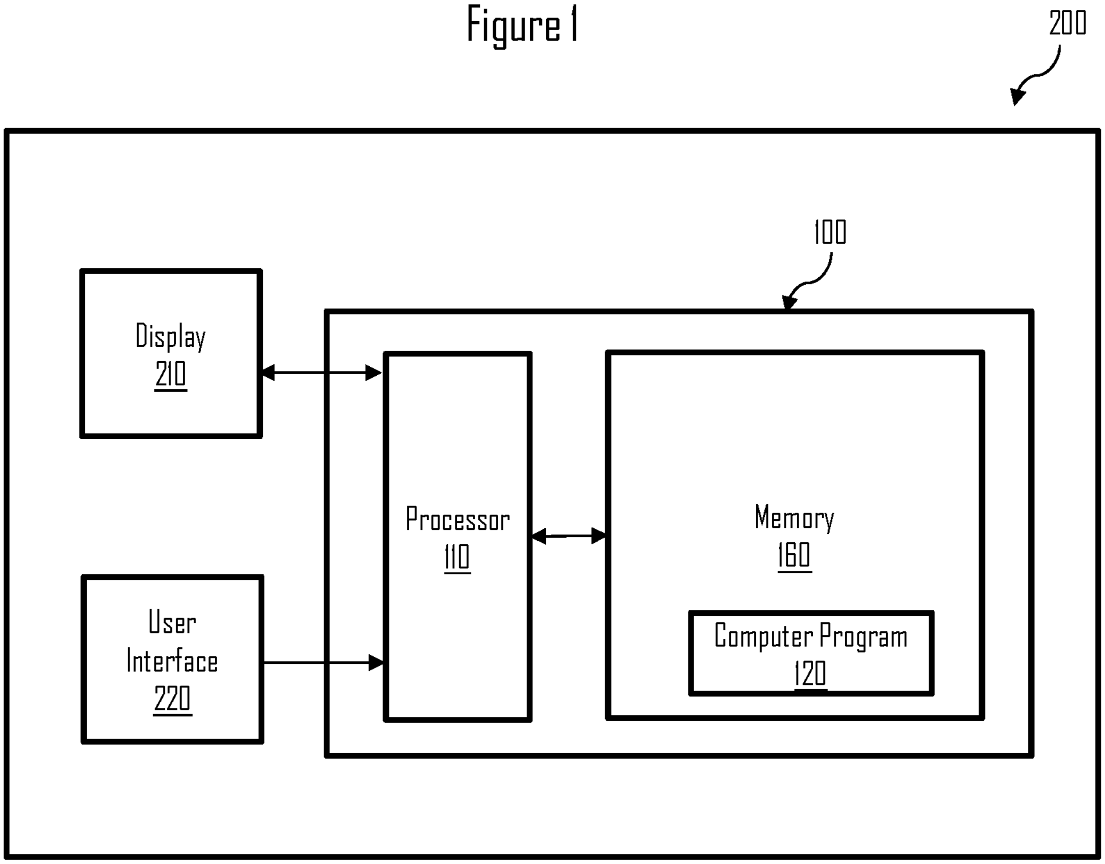
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a module comprised by or communicating with an automation system or a control system, a server device such as a local server or a cloud server, a Personal Computer (PC), a laptop, a desktop, a wireless terminal, a communication terminal, a computing device or the like. In the examples below it is assumed that the apparatus 200 is a computing device.

In the example embodiment of FIG. 2, the apparatus 200 is illustrated as comprising the apparatus 100, a display 210 and a user interface 220 for interacting with the computing device 200. The display 210 may also be configured to act as a user interface. For example, the display may be a touch screen display.

Additionally or alternatively, the user interface may also comprise a manually operable control such as a button, a key, a touch pad, a joystick, a stylus, a pen, a roller, a rocker, a keypad, a keyboard or any suitable input mechanism for inputting and/or accessing information.

In an example embodiment, the display 210 and/or the user interface 220 may be external to the apparatus 200, but in communication with it. In another example embodiment, the apparatus 200 does not comprise a display 210 and/or a user interface 220.

The apparatus 200 of the example of FIG. 2 may also be configured to establish radio communication with another device using, for example, a cellular network, a Bluetooth or WiFi connection or the like.

According to an example embodiment, the apparatus 200 is configured to communicate with a plurality of devices. For example, the apparatus 200 may be configured to communicate with a cloud server, a local server, an edge computing server, a mobile computing device, and/or different kinds of machinery such as rock processing equipment, or the like.

Communicating with a plurality of devices may comprise, for example, receiving and/or transmitting information using a wireless or wired connection. For example, the apparatus 200 may be configured to receive and/or transmit measurement data, trends, recommendations, instructions such as control signals, information relating to a status of a device, alarms, limits, or the like. Communicating with a plurality of devices may comprise communicating with devices different types of devices such as devices with different capabilities, devices provided by different manufacturers, or the like.

The apparatus 200 may be configured to communicate with rock processing equipment using a web-based solution, using an application program provided for a particular operating system such as Android, iOS, Windows, or the like.

According to an example embodiment, the apparatus 200 is configured to communicate with rock processing equipment provided by different manufacturers. The apparatus 200 may be configured to receive, for example, measurement data, trends, instructions and/or alarms from rock processing equipment provided by different manufacturers and/or transmit data to the rock processing equipment provided by different manufacturers.

Without limiting the scope of the claims, an advantage of communicating with rock processing equipment provided by different manufacturers is that information may be gathered and/or combined from systems that are noncompatible with each other.

According to an example embodiment, the apparatus 200 is configured to receive information from a plurality of sources of information. The apparatus 200 may be configured to receive information from a source of information via an information channel associated with the source of information. According to an example embodiment, the apparatus 200 is configured to receive information from at least a first source of information and a second source of information.

A source of information may comprise a source configured to generate, or supply, or a source configured to store information. A source configured to generate or supply information may comprise, for example, a sensor, an algorithm, a machine or a user. A source configured to store information may comprise, for example, a data storage or a database.

Without limiting the scope of the claims, an advantage of receiving information from a plurality of sources of information is that information may be combined in order to, for example, provide more reliable information. Another advantage of receiving information from a plurality if sources of information is that information may be gathered in a centralized manner.

According to an example embodiment, the apparatus 200 is configured to receive information relating to operation of the rock processing equipment. According to an example embodiment, the rock processing equipment comprises crushing and/or screening equipment.

Information relating to operation of the rock processing equipment may comprise, for example, parameter settings, measured values and/or threshold values relating to operation of the rock processing equipment. For example, information relating to operation of the rock processing equipment may comprise, for example, main drive power, close side setting (CSS), hydroset pressure, crushing process efficiency, return oil temperature, or the like.

The apparatus 200 may be configured to receive information continuously or discontinuously. Receiving information continuously may comprise, for example, receiving a flow of information such as substantially real-time measurement data. Receiving information discontinuously may comprise, for example, receiving information at set intervals or in response to a performed action.

According to an example embodiment, the apparatus 200 is configured to receive the first type of information and/or the second type of information relating to the rock processing equipment via a wireless connection.

According to an example embodiment, the apparatus 200 is configured to receive different types of information. The apparatus 200 may be configured to receive different types of information via a plurality of information channels. According to an example embodiment, the apparatus 200 is configured to receive at least a first type of information and a second type of information. According to an example embodiment, the first type of information is different from the second type of information.

Different types of information may comprise information provided by different sources of information. Different types of information may comprise different types of content, for example, measurement data, user inputs, computed data, instructions, user guides, feedback, or the like. As another example, different types of information may comprise different formats of information such as textual information, numeric information, visual information such as an image, audio information, or a combination thereof.

According to an example embodiment, the apparatus 200 is configured to receive a first type of information relating to operation of rock processing equipment from a first source of information. The apparatus 200 may be configured to receive the first type of information via a wired or wireless connection.

The first type of information may comprise, for example, information provided by the first source of information. The first type of information may comprise, for example, information generated, gathered or stored by the first source, or a combination thereof.

The first type of information may comprise, for example, signals, equipment related data, personal data, a data stream, input data input by an operator, maintenance personnel, or the like.

According to an example embodiment, the first type of information comprises measurement data relating to operation of the rock processing equipment. The measurement data may comprise, for example, main drive power, close side setting (CSS), hydroset pressure, crushing process efficiency, return oil temperature, or the like.

According to an example embodiment, the first type of data comprises historical data, real-time data and/or a future prediction. Historical data may comprise, for example, historical measurement data relating to the rock processing equipment and real-time time data may comprise, for example, the latest measurement values relating to the rock processing equipment. A future prediction may comprise a prediction based on historical data and/or real-time data.

According to an example embodiment, the first type of information comprises substantially real-time data. Substantially real-time data may comprise data with a delay in the range of seconds such as 1 to 10 seconds, 30 seconds, 45 seconds, or in the range of minutes such as 1 to 3 minutes, 5 minutes or 10 minutes.

According to another example embodiment, the first type of information comprises one or more parameters and/or parameter settings relating to operation of the rock processing equipment. The one or more parameters and/or parameter settings may comprise, for example, automation parameters and/or parameter settings.

According to an example embodiment, the first source of information comprises at least one sensor associated with the rock processing equipment.

According to an example embodiment, the apparatus 200 is configured to receive a second type of information relating to the operation of the rock processing equipment from a second source of information.

The second type of information may comprise, for example, information provided by the second source of information. The second type of information may comprise, for example, information generated, gathered or stored by the second source. Similarly to receiving the first type of information, the apparatus 200 may be configured to receive the second type of information via a wired or wireless connection.

The second type of information may comprise, for example, signals, equipment related data, personal data, a data stream, input data input by an operator, maintenance personnel, or the like.

According to an example embodiment, the second type of information comprises inspection information. Inspection information may comprise information received by performing an inspection of the rock processing equipment. Inspection may comprise comparing data with one or more reference values. Inspection information may comprise information received as a result of inspection. Inspection information may comprise data relating to measurement inspection, visual inspection, auditory inspection, or the like.

According to an example embodiment, the second type of information comprises data relating to visual inspection of the rock processing equipment. A visual inspection may be performed by a user or utilizing a camera and one or more machine learning algorithms. Data relating to visual inspection may comprise, for example, a note of a status of the rock processing equipment provided by a user or image data captured by a camera.

According to an example embodiment, the first source of information is different from the second source of information.

According to an example embodiment, the second source of information comprises a note received from a user.

According to an example embodiment, the apparatus 200 is configured to determine, based on the first type of information and the second type of information, a state of the rock processing equipment.

Determining a state of the rock processing equipment may comprise one or more operations such as analyzing the first type of information and the second type of information, combining the first type of information and the second type of information, validating the first type of information with the second type of information, supplementing the first type of information with the second type of information, comparing or correlating the first type of information and the second type of information, providing an estimate based on the first type of information and the second type of information, and/or the like.

Determining may, additionally or alternatively, comprise predicting the state of the rock processing equipment based on the first type of information and the second type of information. Predicting the state of the rock processing equipment may comprise providing different kinds of health indicators, failure predictions and/or remaining useful life.

Without limiting the scope of the claims, an advantage of determining a state of the rock processing equipment based in the first type of information and the second type of information is that the state of the rock processing equipment may be determined in a more reliable manner. For example, assuming the first type of information comprises measurement data relating to the rock processing equipment, determining a state of the rock processing equipment might be misleading, if, for example, circumstances of the rock processing equipment are not taken into account.

The state of the rock processing equipment may comprise a general state of the equipment, a state of a component included in the equipment, an operating state of the rock processing equipment, a condition of the rock processing equipment, a failure state, or the like. More specifically, the state of the rock processing equipment may comprise, for example, information describing behavior of the rock processing equipment such as consolidated analytics and/or trends, actual data, analytics and/or trends, or the like.

According to an example embodiment, the state of the rock processing equipment comprises a state of health of the rock processing equipment. According to an example embodiment, the state of the rock processing equipment comprises a state of health of a component included in the rock processing equipment.

A state of health of the rock processing equipment may comprise a current state of health or a predicted state of health of the rock processing equipment.

According to an example embodiment, the apparatus 200 is configured to provide, in response to determining that the state of the rock processing equipment fulfills at least one criterion, an indication relating to the state of the rock processing equipment.

The at least one criterion may comprise, for example, a threshold value for a parameter value relating to the state of the rock processing equipment. Therefore, determining that the state of the rock processing equipment fulfills at least one criterion may comprise, for example, determining the that a parameter value corresponding to the state of the rock processing equipment is above or below a threshold value.

An indication relating to the state of the rock processing equipment may comprise, for example, a report of the state of the rock processing equipment, a prediction relating to the state of the rock processing equipment, a recommendation based on the state of the rock processing equipment, an alert relating to the state of the rock processing equipment, or the like.

A prediction relating to the state of the rock processing equipment may comprise, for example, a prediction relating to maintenance of the rock processing equipment. According to an example embodiment, the indication relating to the state of the rock processing equipment comprises a prediction of the state of the rock processing equipment.

A recommendation based on the state of the rock processing equipment may comprise, for example, a recommendation to take action such as a recommendation to replace a component with another component. A recommendation may further comprise guidance on performing the action such as a link to an online store for ordering the replacement component.

According to an example embodiment, the indication relating to the state of the rock processing equipment comprises a service recommendation.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200.

The means for performing the features of the claimed invention may comprise means for receiving a first type of information relating to operation of rock processing equipment from a first source of information, means for receiving a second type of information relating to the operation of the rock processing equipment from a second source of information, means for determining, based on the first type of information and the second type of information, a state of the rock processing equipment, and means for providing, in response to determining that the state of the rock processing equipment fulfills at least one criterion, an indication relating to the state of the rock processing equipment.

The apparatus 200 may further comprise means for communicating with rock processing equipment provided by different manufacturers and/or means for receiving the information relating to the rock processing equipment via a wireless connection.

Figure 3:
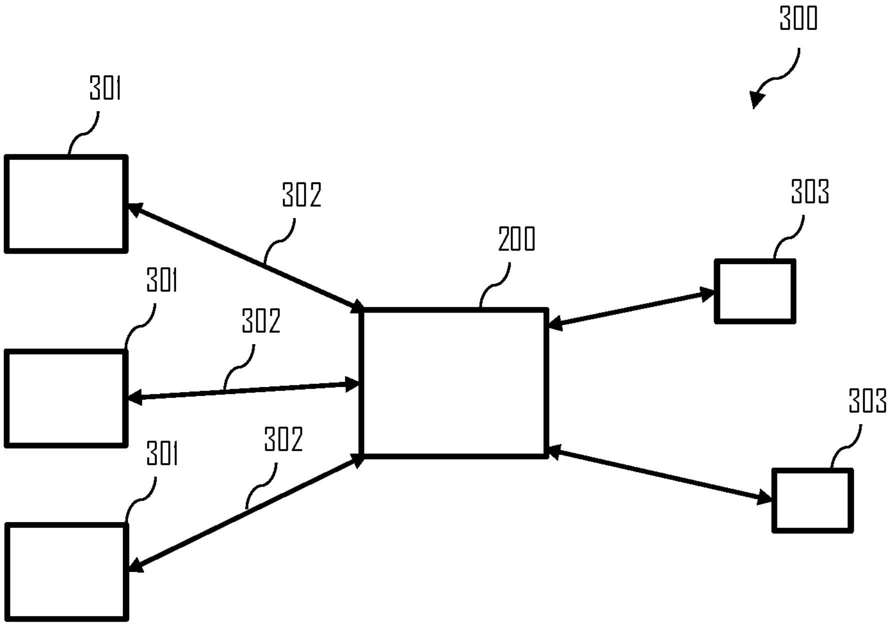
FIG. 3 illustrates an example system in which examples of the disclosed embodiments may be applied.

FIG. 3 illustrates an example system 300 in which examples of the disclosed embodiments may be applied. The system comprises the apparatus 200, rock processing equipment 301 and a plurality of terminal devices 303.

In the example of FIG. 3, the apparatus 200 comprises an edge computing server providing execution resources close to the rock processing equipment 301, thereby enabling real-time or near real-time computing. An edge computing server may further be configured to communicate with a cloud server. The apparatus 200 is configured to communicate with the rock processing equipment 301 and the plurality of terminal devices 303.

The apparatus 200 is configured to receive 302 a first type of information relating to operation of rock processing equipment from the rock processing equipment 301 and a second type of information relating to operation of rock processing equipment from at least one terminal device 303. In the example of FIG. 3, the first type of information relating to operation of the rock processing equipment 301 comprises measurement data and the second type of information relating to operation of the rock processing equipment comprises a note input by a user via a terminal device 303.

In the example of FIG. 3, the apparatus 200 is further configured to determine, based on the first type of information and the second type of information, a state of the rock processing equipment 301 and provide, in response to determining that the state of the rock processing equipment 301 fulfills at least one criterion, an indication relating to the state of the rock processing equipment 301.

An indication relating to the state of the rock processing equipment may comprise, for example, a report of the state of the rock processing equipment, a prediction relating to the state of the rock processing equipment, a recommendation based on the state of the rock processing equipment, an alert relating to the state of the rock processing equipment, or the like.

Figure 4:
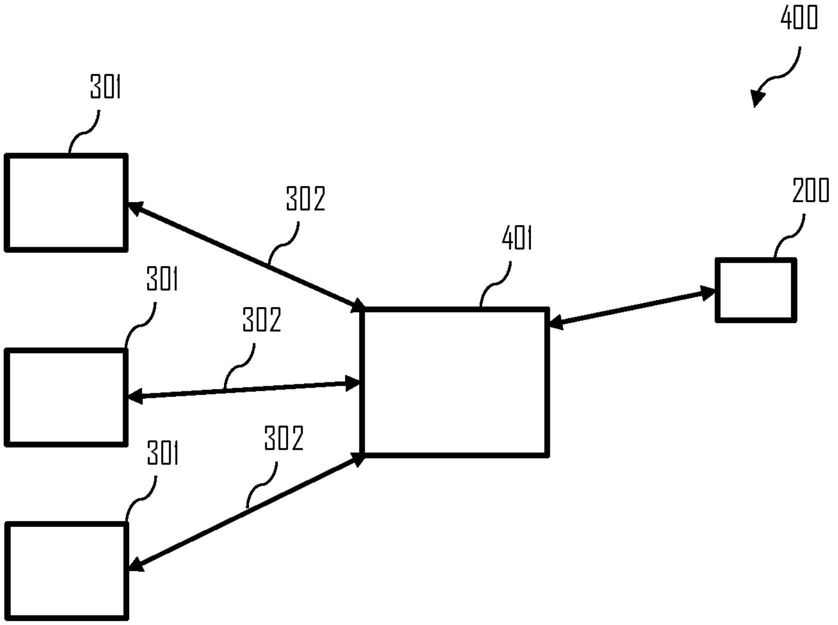
FIG. 4 illustrates another example system in which examples of the disclosed embodiments may be applied.

FIG. 4 illustrates another example system 400 in which examples of the disclosed embodiments may be applied. The system comprises the apparatus 200, rock processing equipment 301 and a server device 401 such as an edge computing server.

In the example of FIG. 4, the apparatus 200 comprises a terminal device configured to communicate with the server device 401. The apparatus 200 may also be configured to communicate with the rock processing equipment 301 via the server device 401. More specifically, the apparatus 200 comprises an application program or a web browser enabling communicating with the server device 401.

The apparatus 200 is configured to receive a first type of information relating to operation of rock processing equipment from the server device 401 and a second type of information relating to operation of rock processing equipment via a user interface of the apparatus 200. In the example of FIG. 4, the first type of information relating to operation of the rock processing equipment 301 comprises measurement data and the second type of information relating to operation of the rock processing equipment comprises a note input by a user via the apparatus 200.

In the example of FIG. 4, the apparatus 200 is further configured to determine, based on the first type of information and the second type of information, a state of the rock processing equipment 301 and provide, in response to determining that the state of the rock processing equipment 301 fulfills at least one criterion, an indication relating to the state of the rock processing equipment 301.

Similarly to the example of FIG. 3, an indication relating to the state of the rock processing equipment may comprise, for example, a report of the state of the rock processing equipment, a prediction relating to the state of the rock processing equipment, a recommendation based on the state of the rock processing equipment, an alert relating to the state of the rock processing equipment, or the like.

Figure 5A:
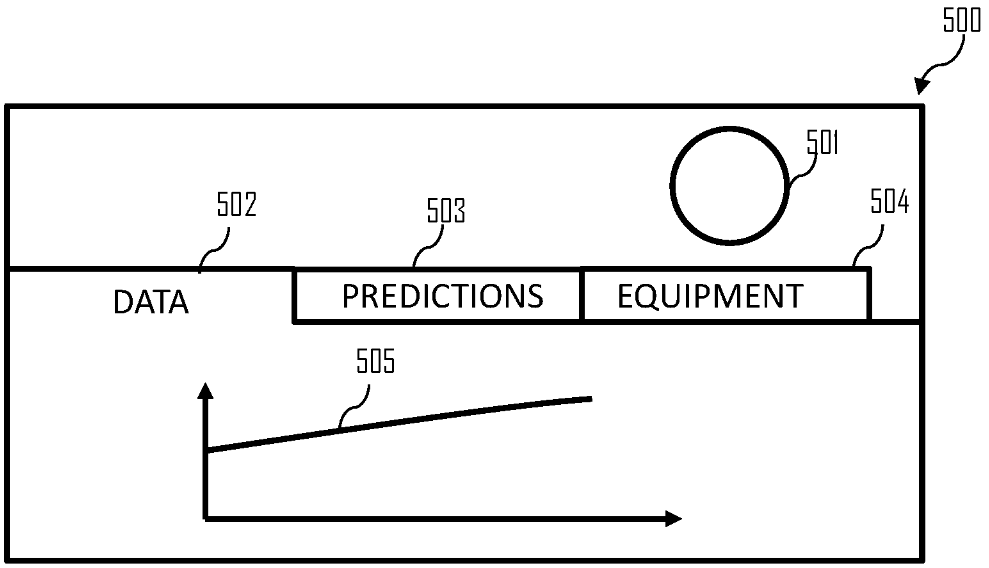
FIGS. 5A, 5B and 5C illustrate example user interfaces incorporating aspects of examples of the invention.
Figure 5B:
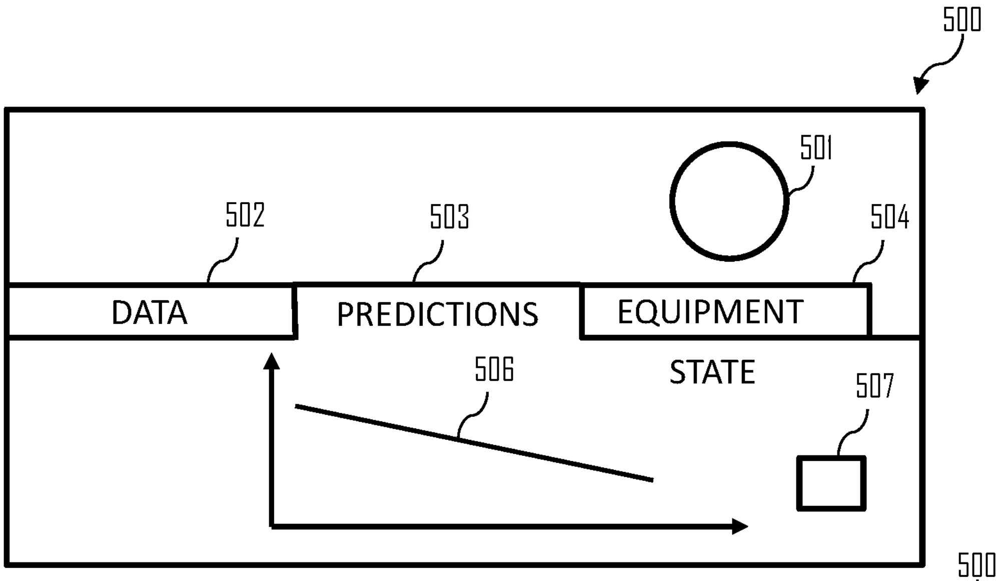
Figure 5C:
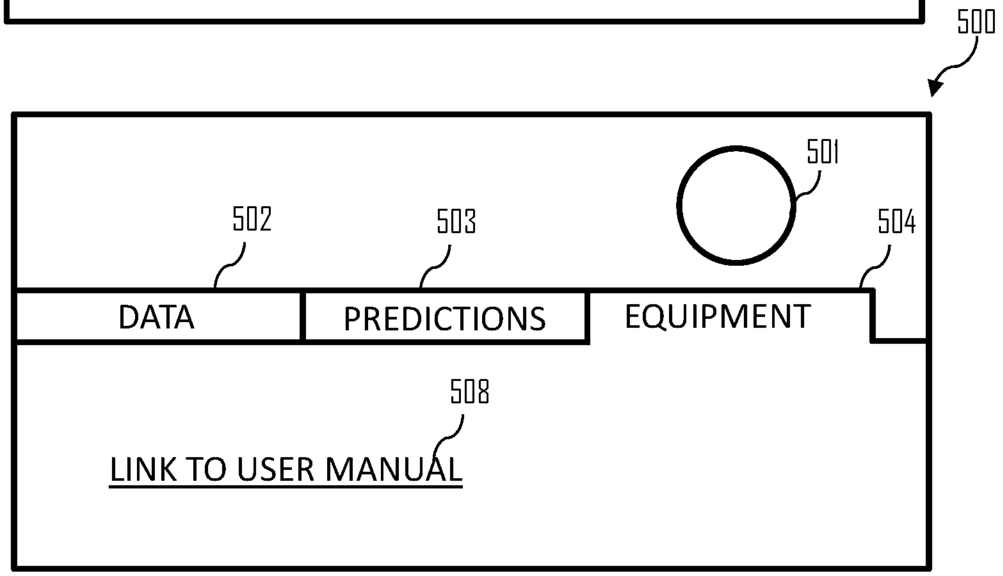

FIGS. 5A, 5B and 5C illustrate example user interfaces 500 incorporating aspects of examples of the invention. The example user interface may be provided by the apparatus 200. The apparatus 200 may comprise a server device or a terminal device.

FIG. 5A illustrates a user interface 500 comprising a representation 501 of rock processing equipment 301. The user interface 500 further comprises a first section 502, a second section 503 and a third section 504. The first section 502 is labelled as "Data", the second section 503 is labelled as "Predictions" and the third section 504 is labelled as "Equipment". Different sections 502, 503, 504 provide information from different sources of information. In the example of FIG. 5A, the first section 502 provides an illustration 505 of measurement data for monitoring the rock processing equipment. The measurement data may comprise real-time or near real-time data.

FIG. 5B illustrates the second section 503 of the user interface 500, the second section being labelled as "Predictions". The second section 503 provides an illustration 506 of a predicted state of the rock processing equipment. The predicted stat of the rock processing equipment may comprise, for example, health of state of the rock processing equipment or health of state of a particular component included in the rock processing equipment. The second section 503 further comprise a control element 507 for inputting a note form the user. The note may comprise, for example, conclusions of visual inspection of the rock processing equipment performed by the user.

FIG. 5C illustrates the third section 504 of the user interface 500, the third section being labelled as "Equipment". The third section 504 provides general information relating to the rock processing equipment. In the example if FIG. 5C, the general information relating to the rock processing equipment comprises a link to the user manual 508.

Figure 6:
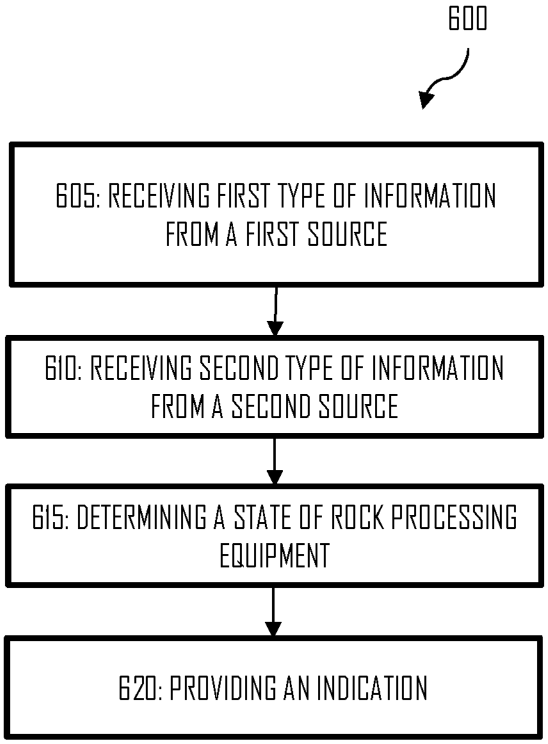
FIG. 6 shows an example method incorporating aspects of examples of the invention.

FIG. 6 illustrates an example method 600 incorporating aspects of the previously disclosed embodiments. More specifically, the example method 600 illustrates determining a state of rock processing equipment. In the example of FIG. 6, the method 600 is performed by the apparatus 200. The apparatus 200 may comprise a server such as a cloud server or a local server, or a mobile terminal such as a mobile computing device.

The method starts with receiving 605 a first type of information relating to operation of rock processing equipment from a first source of information. The first type of information may comprise, for example, information provided by the first source of information. The first type of information may comprise, for example, information generated, gathered or stored by the first source.

The method continues with receiving 610 a second type of information relating to the operation of the rock processing equipment from a second source of information. The second type of information may comprise, for example, information provided by the second source of information. The second type of information may comprise, for example, information generated, gathered or stored by the second source. Similarly to receiving the first type of information, the apparatus 200 may be configured to receive the second type of information via a wired or wireless connection.

The method further continues with determining 615, based on the first type of information and the second type of information, a state of the rock processing equipment.

Determining a state of the rock processing equipment may comprise one or more operations such as analyzing the first type of information and the second type of information, combining the first type of information and the second type of information, validating the first type of information with the second type of information, supplementing the first type of information with the second type of information, comparing or correlating the first type of information and the second type of information, providing an estimate based on the first type of information and the second type of information, and/or the like.

The method further continues with providing 620, in response to determining that the state of the rock processing equipment fulfills at least one criterion, an indication relating to the state of the rock processing equipment.

The at least one criterion may comprise, for example, a threshold value for a parameter relating to the state of the rock processing equipment. Therefore, determining that the state of the rock processing equipment fulfills at least one criterion may comprise, for example, determining the that a parameter value corresponding to the state of the rock processing equipment is above or below a threshold value.

An indication relating to the state of the rock processing equipment may comprise, for example, a report of the state of the rock processing equipment, a prediction relating to the state of the rock processing equipment, a recommendation based on the state of the rock processing equipment, an alert relating to the state of the rock processing equipment, or the like.

A prediction relating to the state of the rock processing equipment may comprise, for example, a prediction relating to maintenance of the rock processing equipment, while a recommendation based on the state of the rock processing equipment may comprise, for example, a recommendation to replace a component with another component. A recommendation may comprise, for example, a link to an online store for ordering the replacement component.

Without limiting the scope of the claims, an advantage of determining a state of rock processing equipment based on information from a plurality of sources of information is that information may be gathered in a centralized manner for monitoring and/or controlling the rock processing equipment even if pieces of the rock processing equipment were noncompatible with each other. Another advantage is a customized system may be provided such that operation, service and data may be utilized in an efficient manner thereby improving efficiency of the rock processing equipment.

Without in any way limiting the scope, interpretation, or application of the claims appearing below, a technical effect of one or more of the example embodiments disclosed herein is that a crushing plant may be monitored and/or controlled using a common user interface thereby making monitoring and/or controlling the crushing plant more efficient.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for determining a state of rock processing equipment, the apparatus comprising at least one processor and at least one memory including computer program code, the at least one memory and the computer program code configured to, with the at least one processor, cause the apparatus at least to:

receive a first type of information including measurement data relating to operation of rock processing equipment from a first source of information;

receive a second type of information including inspection or user-related information relating to the operation of the rock processing equipment from a second source of information;

determine, based on the first type of information and the second type of information, a state of the rock processing equipment; and provide, in response to determining that the state of the rock processing equipment fulfills at least one criterion, an indication relating to the state of the rock processing equipment.

2. The apparatus according to claim 1, wherein the first type of information comprises measurement data relating to operation of the rock processing equipment.

3. The apparatus according to claim 1, wherein the first type of information includes substantially real-time data.

4. The apparatus according to claim 1, wherein the second type of information includes data relating to a visual inspection or an auditory inspection of the rock processing equipment.

5. The apparatus according to any claim 1, wherein the first type of information and the second type of information comprise different formats of information.

6. The apparatus according to claim 1, wherein the first source of information includes at least one sensor associated with the rock processing equipment.

7. The apparatus according to claim 1, wherein the second source of information includes a note received from a user.

8. The apparatus according to claim 1, wherein the state of the rock processing equipment includes a state of health of the rock processing equipment.

9. The apparatus according to claim 1, wherein the indication relating to the state of the rock processing equipment includes a service recommendation.

10. The apparatus according to claim 1, wherein the indication relating to the state of the rock processing equipment includes a prediction of the state of the rock processing equipment.

11. The apparatus according to claim 1, wherein the at least one memory and the computer program code are further configured to, with the at least one processor, cause the apparatus to communicate with rock processing equipment provided by different manufacturers.

12. The apparatus according to claim 1, wherein the rock processing equipment includes crushing and/or screening equipment.

13. The apparatus according to claim 1, wherein the at least one memory and the computer program code are further configured to, with the at least one processor, cause the apparatus to receive the first type of information and/or the second type of information relating to the rock processing equipment via a wireless connection.

14. A method performed by an apparatus comprising at least one processor and at least one memory including computer program code, the at least one memory and computer program code configured to, with the at least one processor cause the apparatus to perform a method for determining a state of rock processing equipment, the method comprising:

receiving a first type of information including measurement data relating to operation of rock processing equipment from a first source of information;

receiving a second type of information including inspection or user-related information relating to the operation of the rock processing equipment from a second source of information;

determining, based on the first type of information and the second type of information, a state of the rock processing equipment; and providing, in response to determining that the state of the rock processing equipment fulfills at least one criterion, an indication relating to the state of the rock processing equipment.

15. A computer program having-computer executable code, which when executed, cause an apparatus for determining a state of rock processing equipment to perform at least the following:

receiving a first type of information including measurement data relating to operation of rock processing equipment from a first source of information;

receiving a second type of information including inspection or user-related information relating to the operation of the rock processing equipment from a second source of information;

determining, based on the first type of information and the second type of information, a state of the rock processing equipment; and providing, in response to determining that the state of the rock processing equipment fulfills at least one criterion, an indication relating to the state of the rock processing equipment.

* * * * *